(12) United States Patent
Suzuki

(10) Patent No.: US 6,604,170 B1
(45) Date of Patent: Aug. 5, 2003

(54) INFORMATION PROCESSING APPARATUS AND METHOD, AND COMPUTER READABLE MEMORY

(75) Inventor: Yasunori Suzuki, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 103 days.

(21) Appl. No.: 09/671,728

(22) Filed: Sep. 27, 2000

(30) Foreign Application Priority Data

Sep. 28, 1999 (JP) ............................................ 11-275148

(51) Int. Cl.$^7$ .............................................. G06F 12/00
(52) U.S. Cl. ............................ 711/111; 711/112; 707/1; 707/205
(58) Field of Search ...................... 707/1, 205; 711/111, 711/112

(56) References Cited

PUBLICATIONS

Carl Townsend, "Advanced MS–DOS Expert Techniques for Programmers" Howard W. Sams & Company 1989 p. 50–56 ISBN 0–672–22667–7.*

Jeffrey Richter et al. "A File System for the 21$^{st}$ Century: Previewing the Windows NT 5.0 File System" Microsoft System Journal, Nov. 1998 http://www.microsoft.com/msj/1198/ntfs.html.*

Maverick Operating Systems "VFAT Long File Names", Jun. 24, 1999 http://www.maverick.subnet.dk/FileSystem-Formats/VFAT_LongFileNames.html.*

Peter Norton et al. "Inside the PC, Seventh Edition" SAMS Publishing 1997 p. 223–226 ISBN 0–672–31041–4.*

* cited by examiner

Primary Examiner—Reginald G. Bragdon
Assistant Examiner—Paul Baker
(74) Attorney, Agent, or Firm—Fitzpatrick, Cella, Harper & Scinto

(57) ABSTRACT

A directory manager stores and manages storage position information indicating the storage position of a given file in a predetermined storage area in a directory entry that stores information which pertains to the file. A file manager executes access to the file by looking up the directory entry.

9 Claims, 14 Drawing Sheets

F I G. 2
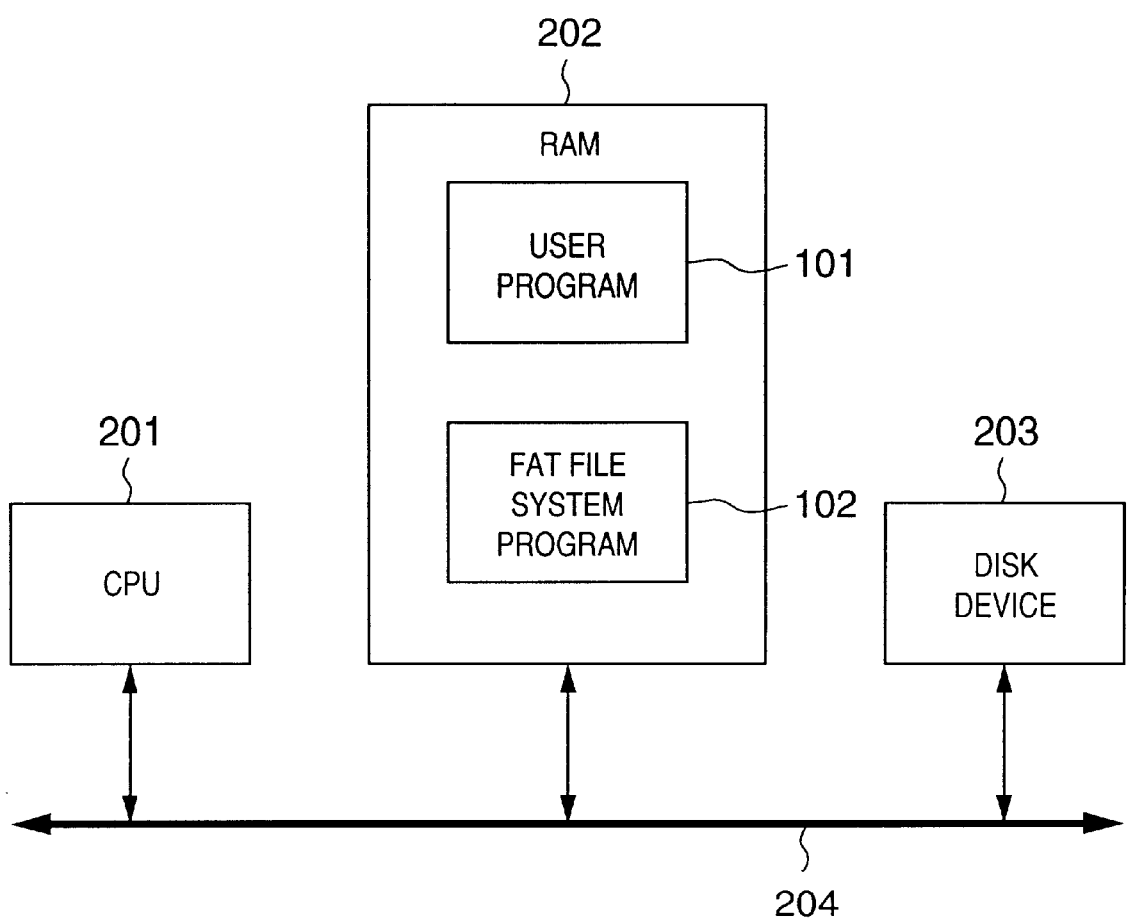

INFORMATION PROCESSING APPARATUS AND METHOD, AND COMPUTER READABLE MEMORY

FIELD OF THE INVENTION

The present invention relates to an information processing apparatus and method for managing files stored on a storage medium, and a computer readable memory.

BACKGROUND OF THE INVENTION

FAT File System

A file system that manages files using a FAT (File Allocation Table) is generally called a FAT file system. A disk medium formatted for use in such FAT file system is called a FAT disk.

FIG. 13 shows an example of the recording format of a FAT disk mainly used in MS-DOS/MS-Windows/MS-Windows 95, 98/MS-Windows NT as the operating system offered by Microsoft Corp.

Not only a FAT disk but also a storage medium called a "disk" are segmented into a plurality of blocks in units of sectors, and data recorded on a disk is read/written in units of sectors. Normally, data for 512 bytes or 1,024 bytes can be recorded per sector.

Reference numeral 1301 denotes one start sector (logical sector number=0), which is normally called a boot sector. The boot sector 1301 records a boot program for loading the operating system, and information such as the numbers of sectors that form a FAT, root directory entry, and the like (to be described later).

Reference numeral 1302 denotes a FAT which is an area for recording the allocation state of clusters to a file. Two FATs 1302 are prepared, as shown in FIG. 13 (FAT1 and FAT2 in FIG. 13), and are successively allocated on the disk. That is, FAT1 and FAT2 always have the same recorded contents.

Reference numeral 1303 denotes a root directory entry. One item of root directory entry 1303 consists of 32 bytes, and the respective items record information such as the names of files and directories (sub directories) present under the root directory of the FAT disk, file sizes (unit: byte), numbers of clusters (start cluster numbers) that record start data in files of clusters that record the contents (data main body) of actual files corresponding to files on the directory entry in a data area (to be described later), and the like.

Reference numeral 1304 denotes a data area for recording the contents (data main body) of actual files, and information that pertains to sub sdirectories. The data area 1304 is managed in units of clusters. Each cluster has a plurality of successive sectors as one unit, and one cluster is made up of sectors, the number of which is expressed by powers of 2 (1, 2, 4, 8, 16, . . . ,). In the following description, assume that one cluster is made up of one sector for the sake of simplicity.

FIG. 14 shows the contents recorded on the area of the FAT 1302 in FIG. 13. Respective items 1402 of the FAT 1302 have one-to-one correspondence with cluster addresses 1403 of the data area 1304. The items 1402 of the FAT 1302 are used to record the order of clusters (FAT chain) so that clusters that form a given file can be read out in a normal order upon reading out that file. That is, the contents of each item 1402 record the value of the next cluster address to be read out in turn, and record a value (e.g., FFFFh) indicating the last cluster for the last cluster of data. In this manner, clusters that form a file can be joined in a correct order.

A detailed explanation will be given with reference to FIG. 14. For example, if a start cluster address 1401 of a given file present under the root directory is 0004h based on information recorded in the root directory entry 1303, since a value "0005h" is written in the (0004h)-th FAT item 1402, it is determined that the subsequent data ('b' of 1403) is recorded at the (0005h)-th cluster address of the data area 1304. Likewise, since a value "000Ah" is written in the (0005h)-th FAT item 1402, it is determined that the next subsequent data ('c' of 1403) is recorded at the (000Ah)-th cluster address. Since a value "FFFFh" indicating the end of a FAT chain is written in the (000Ah)-th FAT item 1402, the (000Ah)-th cluster address in the data area 1304 is the one that contains the last data. Note that a FAT item 1402 which corresponds to a cluster (free cluster) which is not used by any file of those in the data area 1304 is written with 0000h as a value indicating free.

Data Read/Write in FAT File System

The flow of processes upon opening a file present on a FAT disk and reading/writing data of that file in the conventional FAT file system will be explained below. For the sake of simplicity, assume that a file which is to undergo read/write is present under the root directory, and a description of an error process will be omitted.

File Read Process

A file read process will be explained first.

When a given user program designates a file name and a read of that file is requested (file open), data of the root directory entry 1303 is read out first to search for an entry that contains the file name which matches the file name designated by the user program. If an entry that matches the designated file name is found, the start cluster address and file size in the data area 1304 where a data main body is recorded are acquired from that entry item. Upon reading actual file data recorded at the start cluster address of the data area 1304, the area of the aforementioned FAT 1302 is read out to interpret data of the FAT item recorded at the position corresponding to the start cluster address to compute the cluster address where the subsequent file data is recorded. Likewise, the FAT chain is followed to have the start cluster address as the start point and to read out file data in turn until the cluster address that contains the last data is reached.

New File Create Process

A new file create process of the data write process will be explained below.

When a file open request is issued, data in the root directory entry 1303 is read out to confirm if the given file name overlaps the one already present on the root directory entry 1303. If the file name does not overlap, directory entries for this new file are created on the root directory entry 1303. Data of FAT items of the FAT 1302 are read out to search for a FAT item that records a free (0000h) value. If a FAT item that records a free value is found, required data is written at the corresponding cluster address in the data area 1304. At the same time, the value of the FAT item corresponding to the cluster address found as a free cluster in the FAT 1302 is rewritten from "free" (0000h) to a "part of file" (FFFFh). When write data in the data area 1304 cannot fall within one cluster, the FAT 1302 is searched for a FAT item that records a free value, and data is written at the cluster address in the data area 1304 corresponding to that FAT item. At the same time, the value of the FAT item corresponding to the cluster address found as a free cluster is rewritten to FFFFh. At this time, the value of the FAT item corresponding to the cluster address found in the immediately preceding process is rewritten from FFFFh to the cluster address found in the current process. By repeating this sequence, the arrangement order of clusters is recorded in turn, thus completing a FAT chain.

With the aforementioned sequence, after all data have been written in the data area 1304 and the FAT chain have been written in the FAT 1302, pieces of information such as the new file name, start cluster address, file size, and the like are finally recorded in the directory entries for the new file assured previously. In this way, creation of a new file is completed.

Data Additional Write Process to Existing File

In a data additional write process to an existing file, upon receiving a file open request, the FAT chain is followed in turn on the basis of the start cluster address and data in the FAT 1302 to obtain the cluster address at which the last data is recorded, as in the file read process. In this cluster, existing data is written halfway through the cluster size. Hence, data to be additionally written is written after the end of data stored halfway through the cluster. When the data to be additionally written overflows that cluster, the FAT 1302 is searched for a FAT item that records a free value, and the data is written in the corresponding free cluster in the data area 1304. At the same time, the contents of the corresponding FAT item are rewritten to complete the FAT chain.

Finally, information such as the file size after data additional write or the like is recorded in the root directory entry 1303.

Data Overwrite Process on Existing File

In a data overwrite process on an existing file, required data is overwritten on clusters in the data area 1304 corresponding to FAT items in turn from the start cluster address in accordance with the arrangement order of clusters obtained from the current FAT chain. At this time, when the data size of the existing file is larger than that of the overwrite file, "FFFFh" is written in the value of a FAT item corresponding to the last cluster of the data of the overwrite file. On the other hand, "0000h" indicating a free cluster is written in the value of a FAT item corresponding to each remaining cluster that does not store any overwrite data in the FAT chain before overwrite. On the contrary, when the data size of the overwrite file is larger than that of the existing file, after required data is written in all the clusters obtained from the FAT chain before overwrite, the FAT 1302 is searched for a FAT item that records a free value, and data is written in a free cluster in the data area 1304 corresponding to that FAT item, in the same manner as in the data additional write process to the existing file.

Finally, information such as the file size after data overwrite or the like is recorded in the root directory entry 1303.

However, in the method of recording and managing the state of clusters allocated to a given file in the FAT 1302 as in the conventional FAT file system, the FAT 1302 and data area 1304 are separated. Since clusters that record the data main body of a given file are scattered on the data area 1304, when the file is to be read out, processes for reading out the corresponding FAT item and computing the next cluster to be read out must be done every time data for one cluster is read out from the data area 1304. Also, when data is written in a file, FAT items scattered on the FAT 1302 must be searched to find a cluster in which data is to be written. In this way, since the conventional FAT file system follows the FAT chain based on each pointer to the next cluster address recorded in the FAT 1302, a heavy load is imposed on a file read/write process, and that process is time-consuming.

SUMMARY OF THE INVENTION

The present invention has been made in consideration of the aforementioned problems, and has as its object to provide an information processing apparatus and method, which can access data stored on a storage medium at high speed, and a computer readable memory.

In order to achieve the above object, an information processing apparatus according to the present invention comprises the following arrangement. That is, an information processing apparatus for managing a file stored on a storage medium, comprises:

management means for storing and managing storage position information indicating a storage position of one file in a predetermined storage area in a directory entry that stores information which pertains to the file; and execution means for executing access to the file by looking up the directory entry managed by the management means.

Preferably, the management means also stores and manages the storage position information in a dedicated storage area on the storage medium, which stores a file management table for managing the storage position of the file.

Preferably, the predetermined storage area is allocated immediately before an area that stores a file name of the file.

Preferably, the management means stores and manages the storage position information of a portion that exceeds a size of the predetermined storage area in the dedicated storage area when the storage position information to be managed and stored exceeds the size of the predetermined storage area.

Preferably, the management means appends an index indicating that the predetermined storage area stores the storage position information to a head of the predetermined storage area.

Preferably, the execution means preferentially looks up the storage position information of the file stored in the directory entrywhen access to the file is instructed.

In order to achieve the above object, an information processing method according to the present invention comprises the following arrangement. That is, an information processing method for managing a file stored on a storage medium, comprises:

the management step of storing and managing storage position information indicating a storage position of one file in a predetermined storage area in a directory entry that stores information which pertains to the file; and the execution step of executing access to the file by looking up the directory entry managed in the management step.

In order to achieve the above object, a computer readable memory according to the present invention comprises the following arrangement. That is, a computer readable memory that stores a program code of information processing for managing a file stored on a storage medium, comprises:

a program code of the management step of storing and managing storage position information indicating a storage position of one file in a predetermined storage area in a directory entry that stores information which pertains to the file; and a program code of the execution step of executing access to the file by looking up the directory entry managed in the management step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a block diagram showing the hardware arrangement of the information processing apparatus according to the embodiment of the present invention;

DESCRIPTION OF THE PREFERRED EMBODIMENTS

A preferred embodiment of the present invention will be described in detail hereinafter with reference to the accompanying drawings.

System Arrangement

Figure 13:
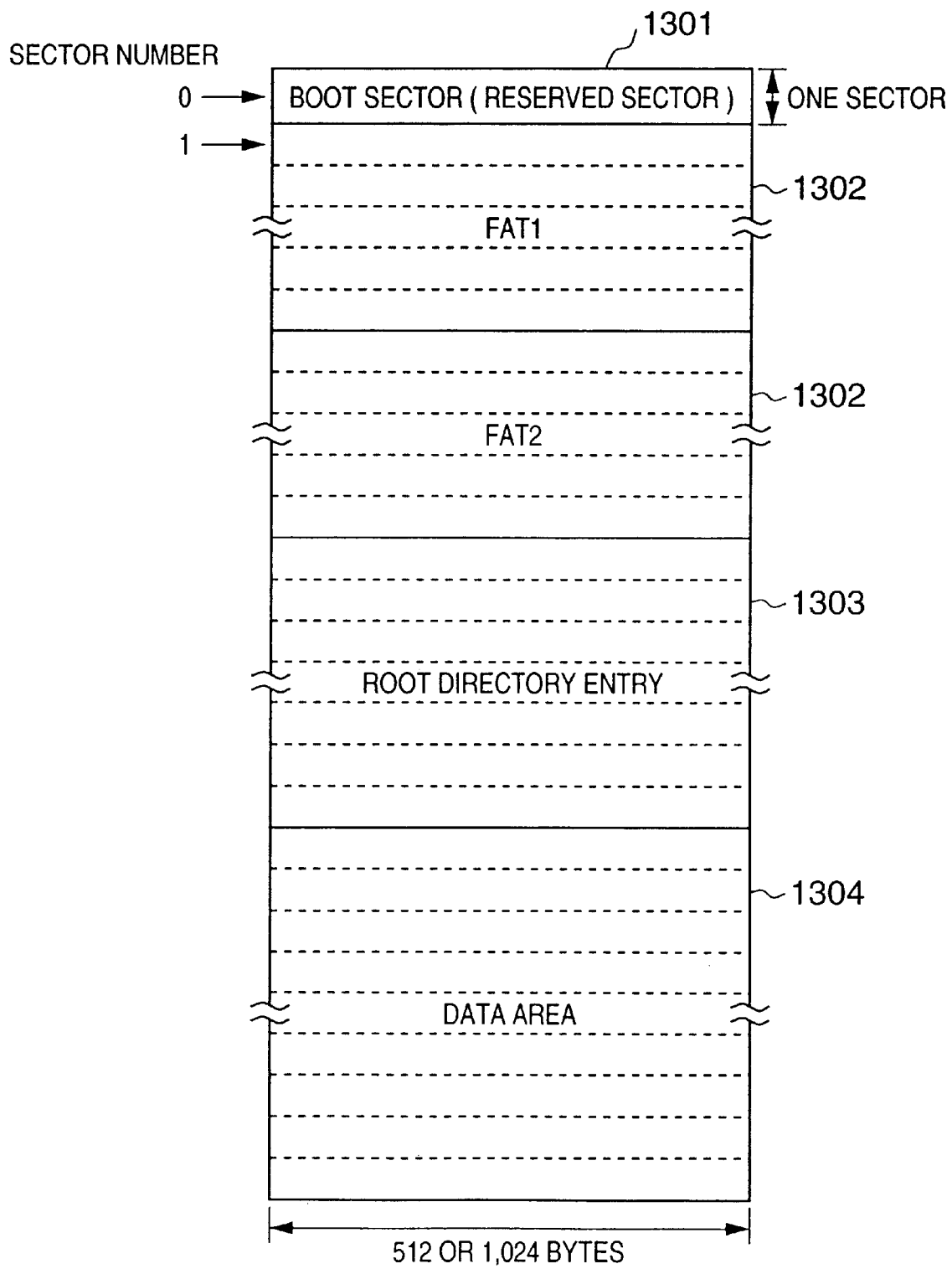
FIG. 13 shows an example of the recording format of a FAT disk.
Figure 14:
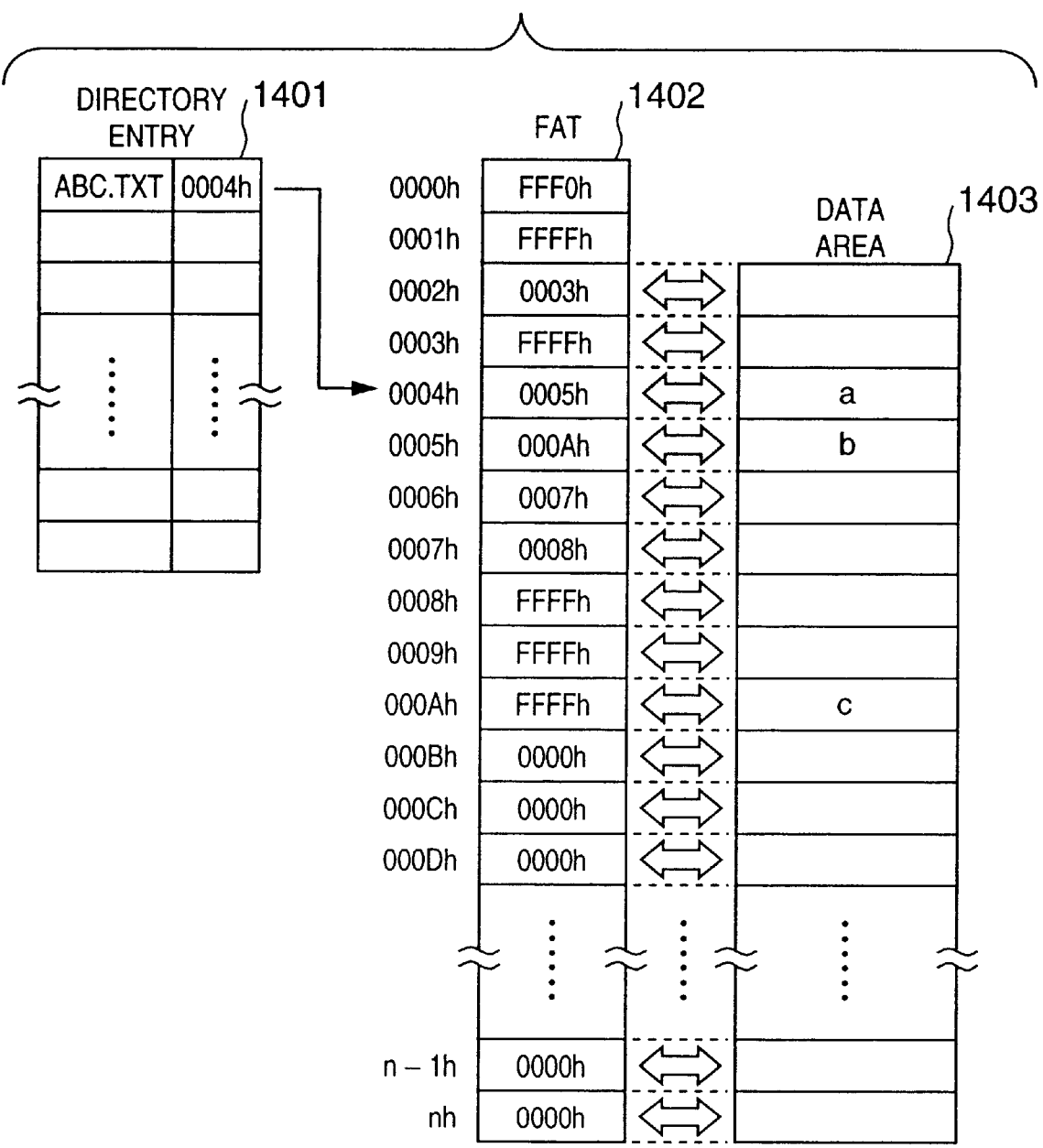
FIG. 14 shows the concept of a FAT area of a FAT disk according to the embodiment of the present invention.

Since the recording format of a FAT disk and the FAT configuration used in the description of this embodiment are the same as those shown in FIGS. 13 and 14 of the prior art, a detailed description thereof will be omitted.

The functional arrangement of an information processing apparatus that implements a FAT file system of this embodiment will be explained below using FIG. 1.

Figure 1:
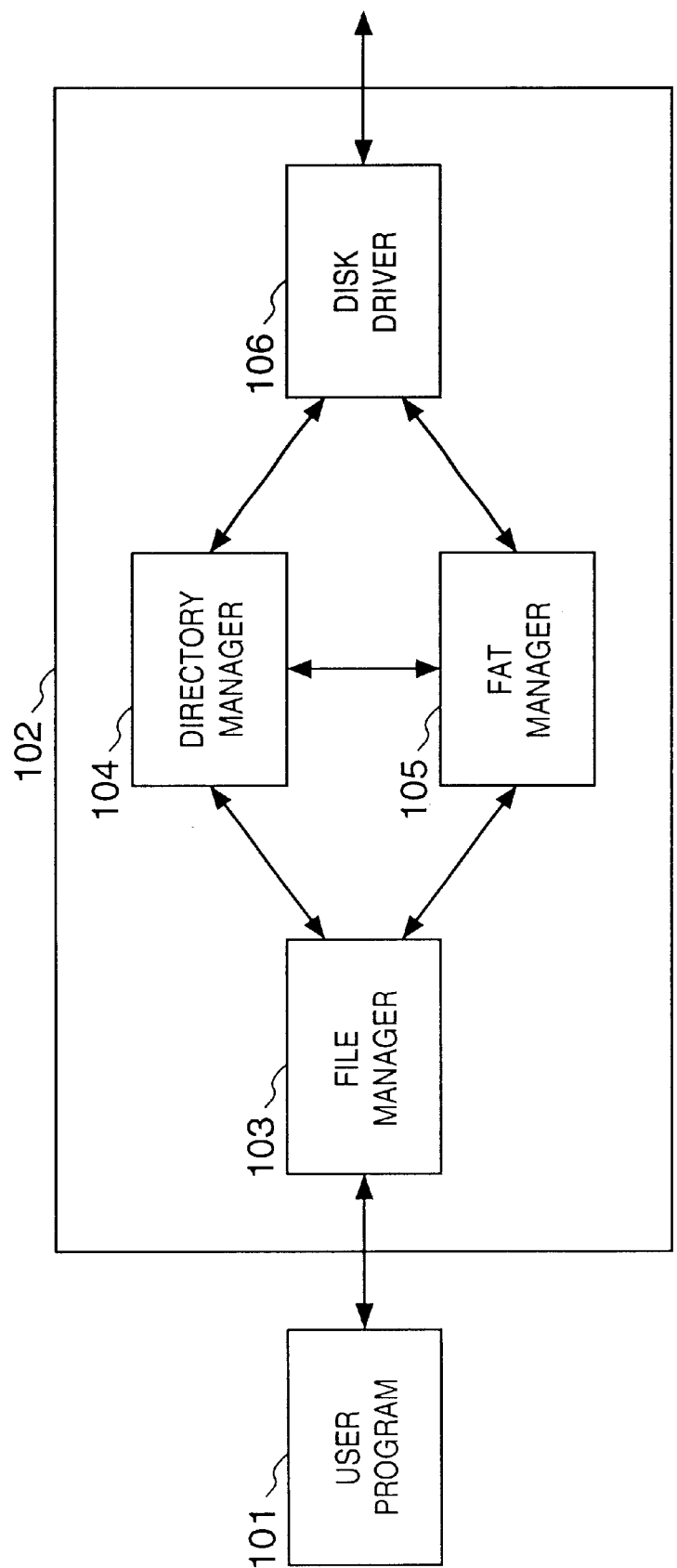
FIG. 1 is a block diagram showing the functional arrangement of an information processing apparatus according to an embodiment of the present invention.

FIG. 1 shows the functional arrangement of an information processing apparatus of this embodiment.

Reference numeral 101 denotes a user program that uses the FAT file system of this embodiment. Reference numeral 102 denotes a FAT file system program that implements the FAT file system. Reference numeral 103 denotes a file manager that executes a process for opening/closing a file designated by, e.g., a file name, a process for creating a new file or deleting an existing file, and management of a file pointer that points to a position on the file space where a read/write is to start, and the like, upon receiving requests from the user program 101.

Reference numeral 104 denotes a directory entry manager that manages the directory structure, e.g., interprets directory entry information read out from a disk to search for a file designated by the user program 101 or writes the latest directory entry information that has changed upon access such as a file write process in the disk. Reference numeral 105 denotes a FAT manager that interprets FAT information read out from the disk, and executes processes for computing a cluster address of a file to undergo a write or read on the disk, forming a normal FAT chain of a file and writing it in the disk, and so forth.

Reference numeral 106 denotes a disk driver for making a read/write to a disk storage medium such as a floppy disk, hard disk, or flash memory card (not shown) used as a data storage area.

The hardware arrangement of the aforementioned information processing apparatus will be explained below using FIG. 2.

FIG. 2 is a block diagram showing the hardware arrangement of the information processing apparatus of this embodiment.

Referring to FIG. 2, reference numeral 201 denotes a CPU for loading and executing the aforementioned user program 101 and FAT file system program 102. Reference numeral 202 denotes a RAM which stores the aforementioned user program 101 and FAT file system program 102, and is also used as a buffer upon reading/writing data on the disk and a work area for saving various variables used upon executing the programs. Reference numeral 203 denotes a disk device having a disk used as a data storage area. Note that the disk includes storage media such as a floppy disk, hard disk, and the like. Reference numeral 204 denotes a system bus that interconnects the CPU 201, RAM 202, and disk device 203.

Respective items of a directory entry of this embodiment will be explained below using FIGS. 3 to 5.

Figure 3:
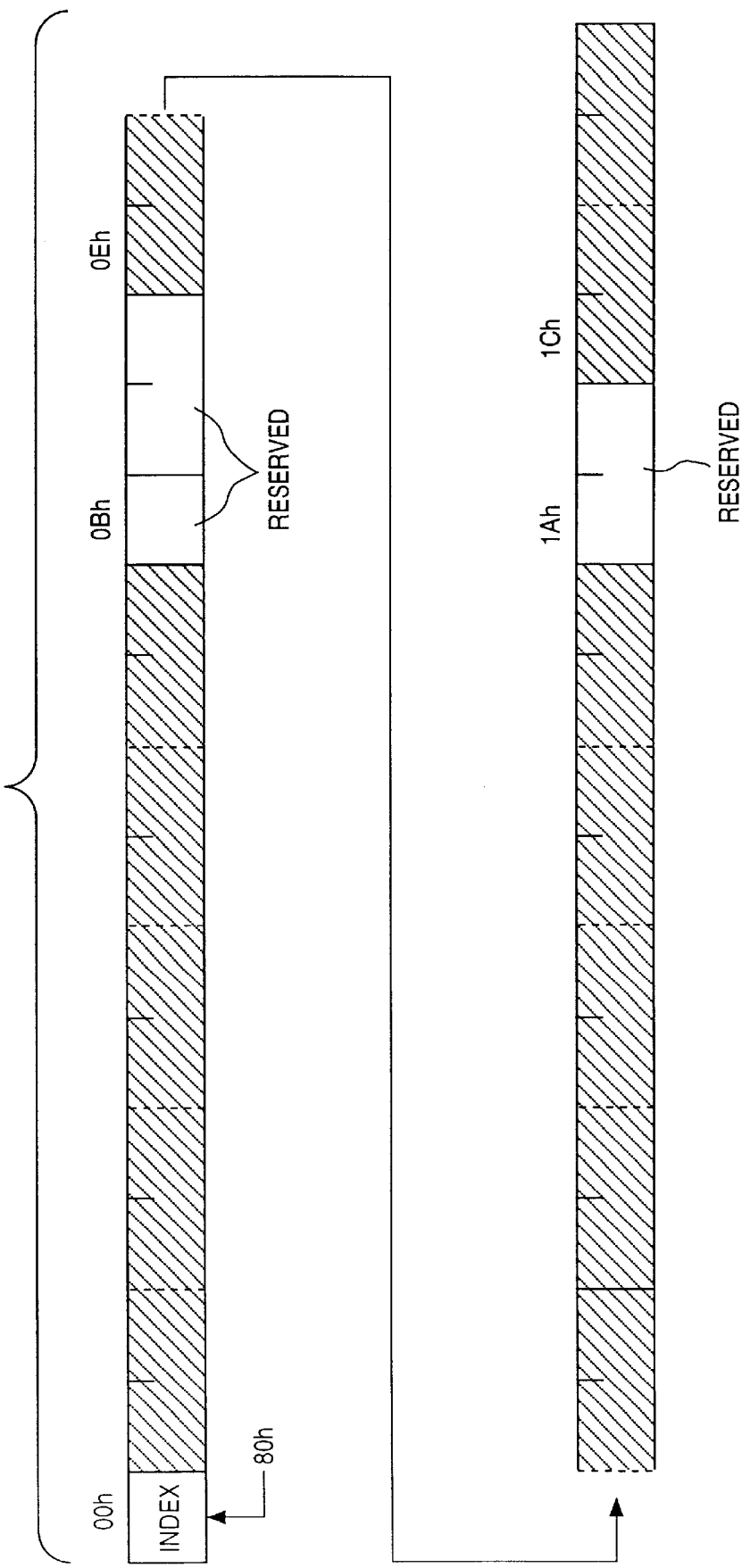
FIG. 3 is a view showing respective items of a directory entry according to the embodiment of the present invention.
Figure 4:
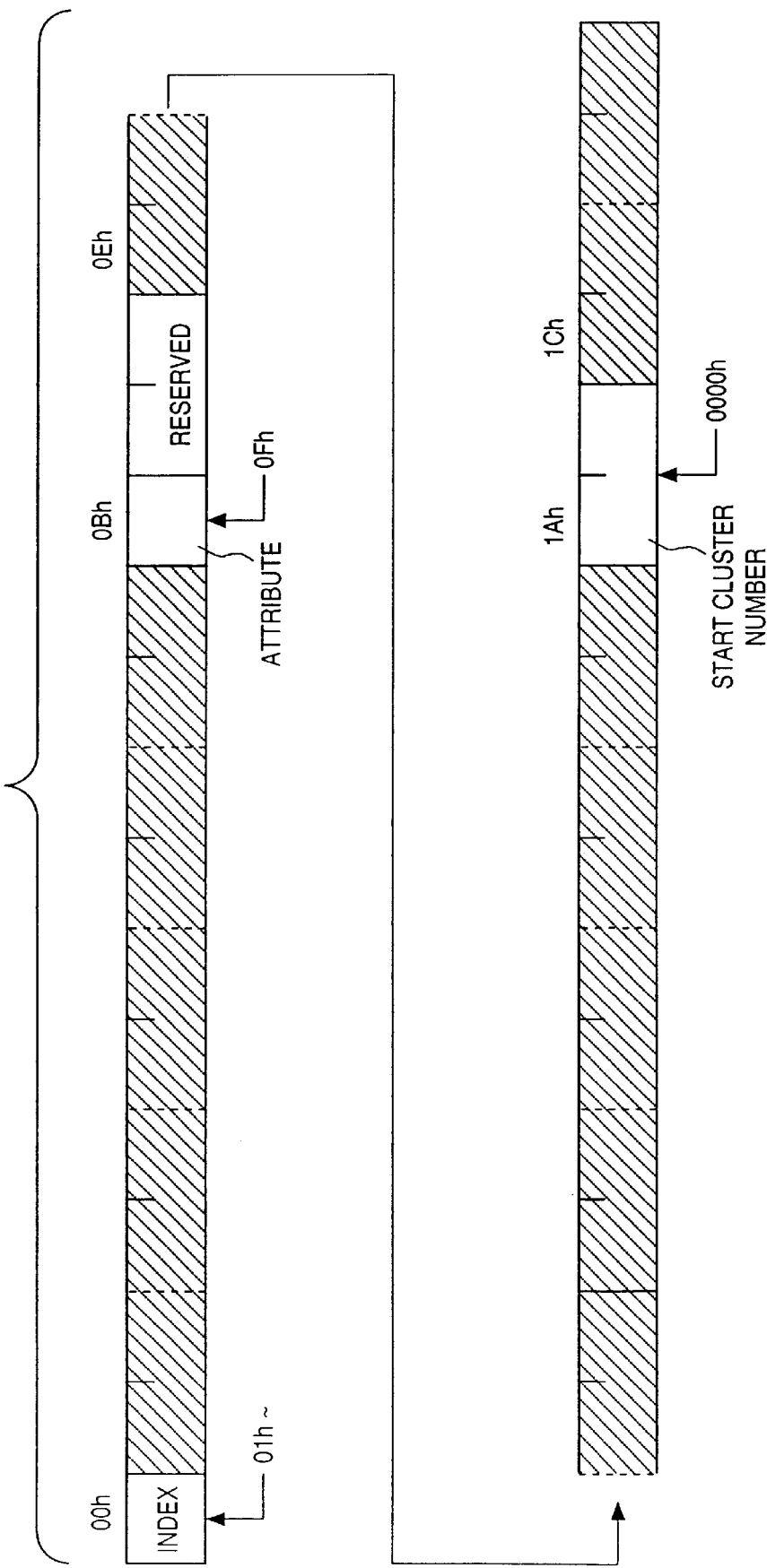
FIG. 4 is a view showing respective items of a directory entry according to the embodiment of the present invention.
Figure 5:
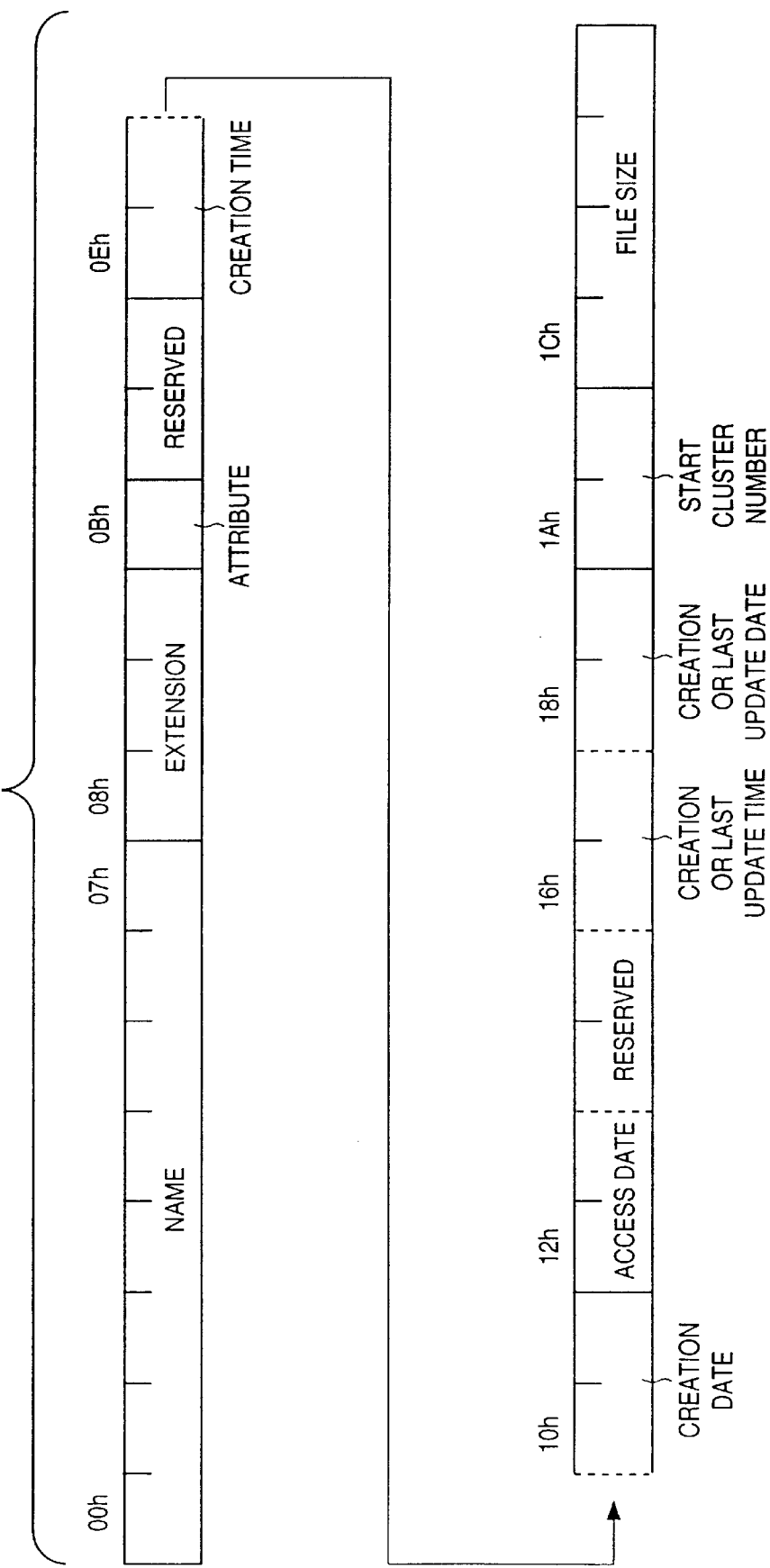
FIG. 5 is a view showing respective items of a directory entry according to the embodiment of the present invention.

FIGS. 3 to 5 show respective items of the directory entry of this embodiment.

Note that one entry of the directory entry shown in FIGS. 3 to 5 comprises 32 bytes.

FIG. 3 shows the structure of the directory entry used to record FAT information of each file in accordance with the cluster allocation order. This directory entry will be referred to as an EXT-FAT in distinction from the conventional FAT 1302 (FIG. 13). In the EXT-FAT, items corresponding to FAT items will be referred to as EXT-FAT items.

The start byte ((00h)-th byte) of the EXT-FAT records an index in which "1" is set in bit 7, so as to be distinguished from the two different directory entries shown in FIGS. 4 and 5 to be described later, and to maintain compatibility with the conventional FAT file system. Bytes 0Bh to 0Dh, and 1Ah and 1Bh are used as reserved areas to maintain compatibility with the conventional directory entry structure. The remaining slots record cluster addresses allocated to a given file in the allocation order from a lower cluster address in correspondence with the number of slots. In this embodiment, a cluster address is expressed by 16 bits (2 bytes). Hence, the EXT-FAT of this embodiment can record FAT information for 13 clusters.

FIG. 4 shows the directory entry structure used to record a so-called long file name such as "abcdefghijklmn.xyz" or the like. The start byte ((00h)-th byte) records an index (a numerical value starting from 01h) indicating the arrangement order of directory entries, the (0Bh)-th byte records a fixed value "0F" as an attribute, and the (1Ah)-th and (1Bh)-th bytes record a fixed value "0000h" as a start cluster number, so that entries of a long file name, which is segmented into a plurality of entries, are arranged in a normal order. In the last directory entry that records the long file name, "1" is set in bit 6 in its index so as to indicate the last entry. Bytes 0Ch and 0Dh form a reserved area. The remaining slots record data obtained by converting the long file name into Unicode in units of characters from a lower address.

FIG. 5 shows the directory entry used to record a file name or the like in the format of "name (eight characters)+"."+"extension (three characters)" (so-called 8.3 formated short file name), which is automatically generated from the aforementioned long file name. Bytes 00h to 07h record "name", and 08h to 0Ah "extension". When "name" or "extension" has less than eight or three characters, these characters are stored in turn from the lower address side, and the remaining slots are filled by a blank code (ASCII code=20h). Byte 0Bh records the file attribute, 0Eh to 11h the file creation time and date, 12h and 13h the date the file was accessed, 16h to 19h the latest time and date the file was created or updated, 1Ah and 1Bh the start cluster number of file data, and 1Ch to 1Fh the file size. Bytes 0Ch and 0Dh, and 14h and 15h are reserved areas.

In a free directory entry which is not used for any of the aforementioned purposes of the directory entry items shown in FIGS. 3 to 5, "00h" is recorded in the start byte to indicate a free entry.

The configuration of directory entries for one file will be explained below using FIG. 6.

Figure 6:
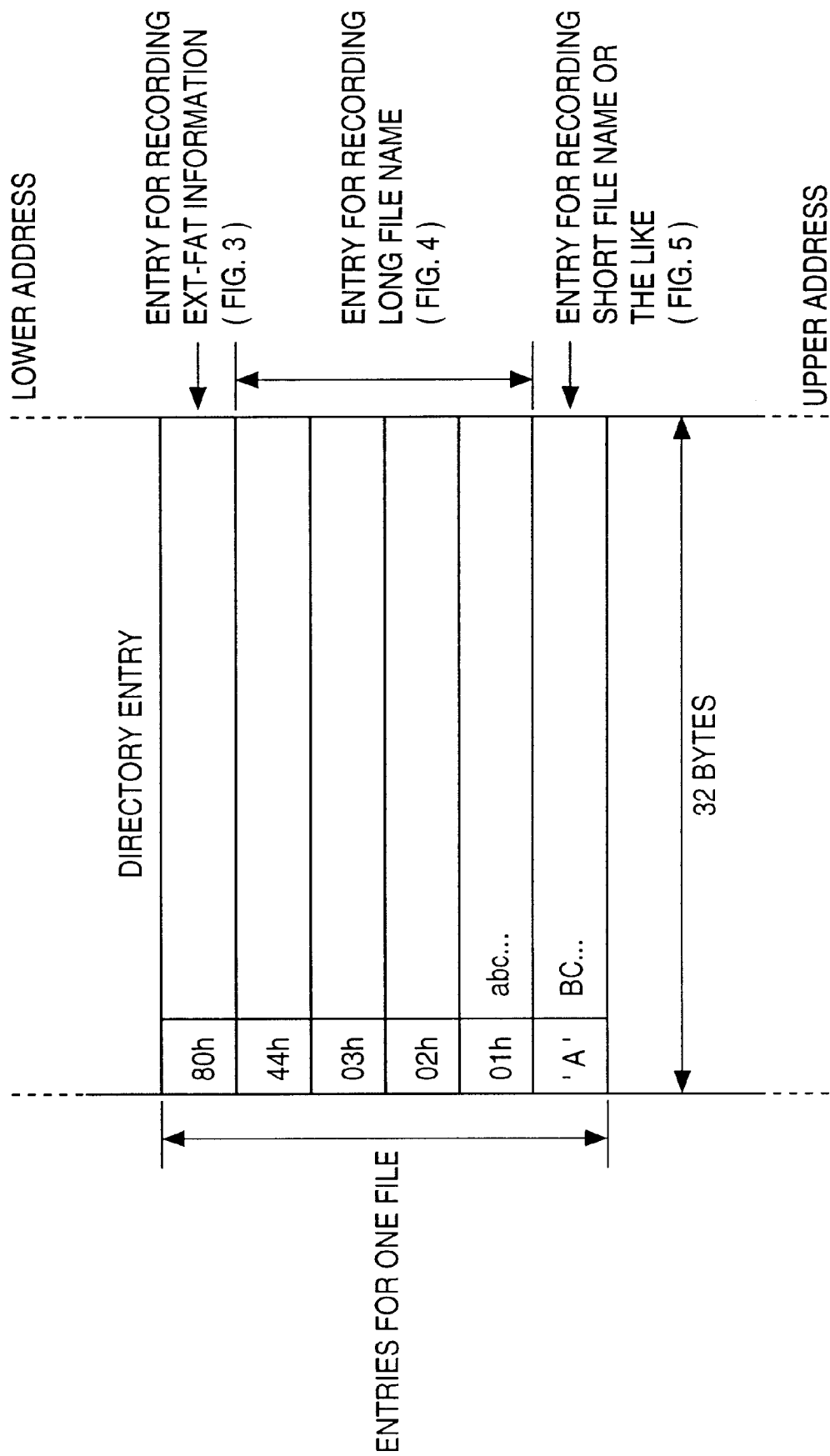
FIG. 6 shows the configuration of directory entries for one file according to the embodiment of the present invention.

FIG. 6 shows the configuration of directory entries for one file in this embodiment.

FIG. 6 especially shows allocation of directory entry items shown in FIGS. 3 to 5 on directory entries. Directory entries for a given file are successively arranged in the order of FIGS. 3 to 5 from a lower address to form directory entry information of each file.

The overall configuration of directory entries of this embodiment will be explained below using FIG. 7.

Figure 7:
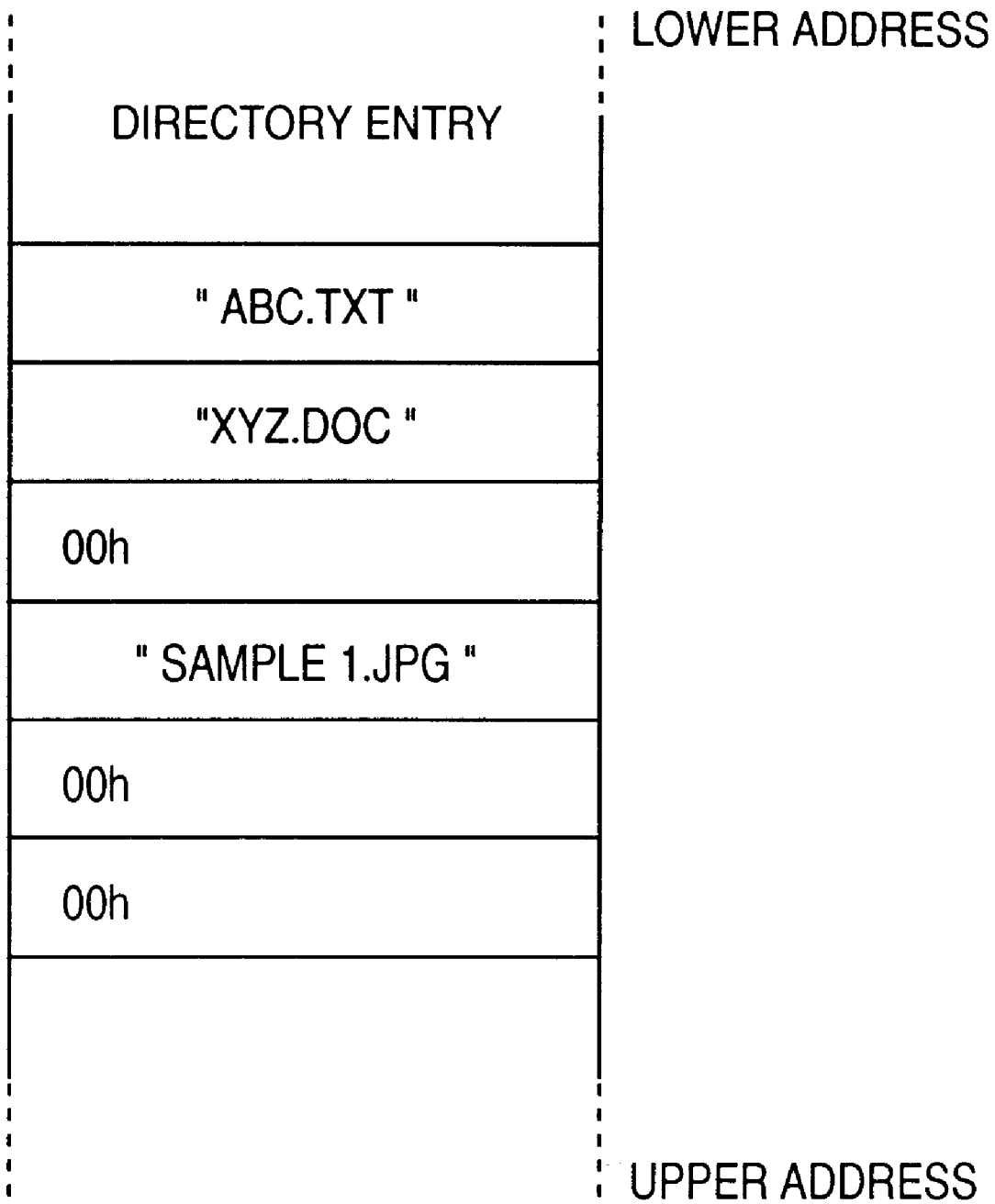
FIG. 7 shows the overall configuration of directory entries according to the embodiment of the present invention.
Figure 8:
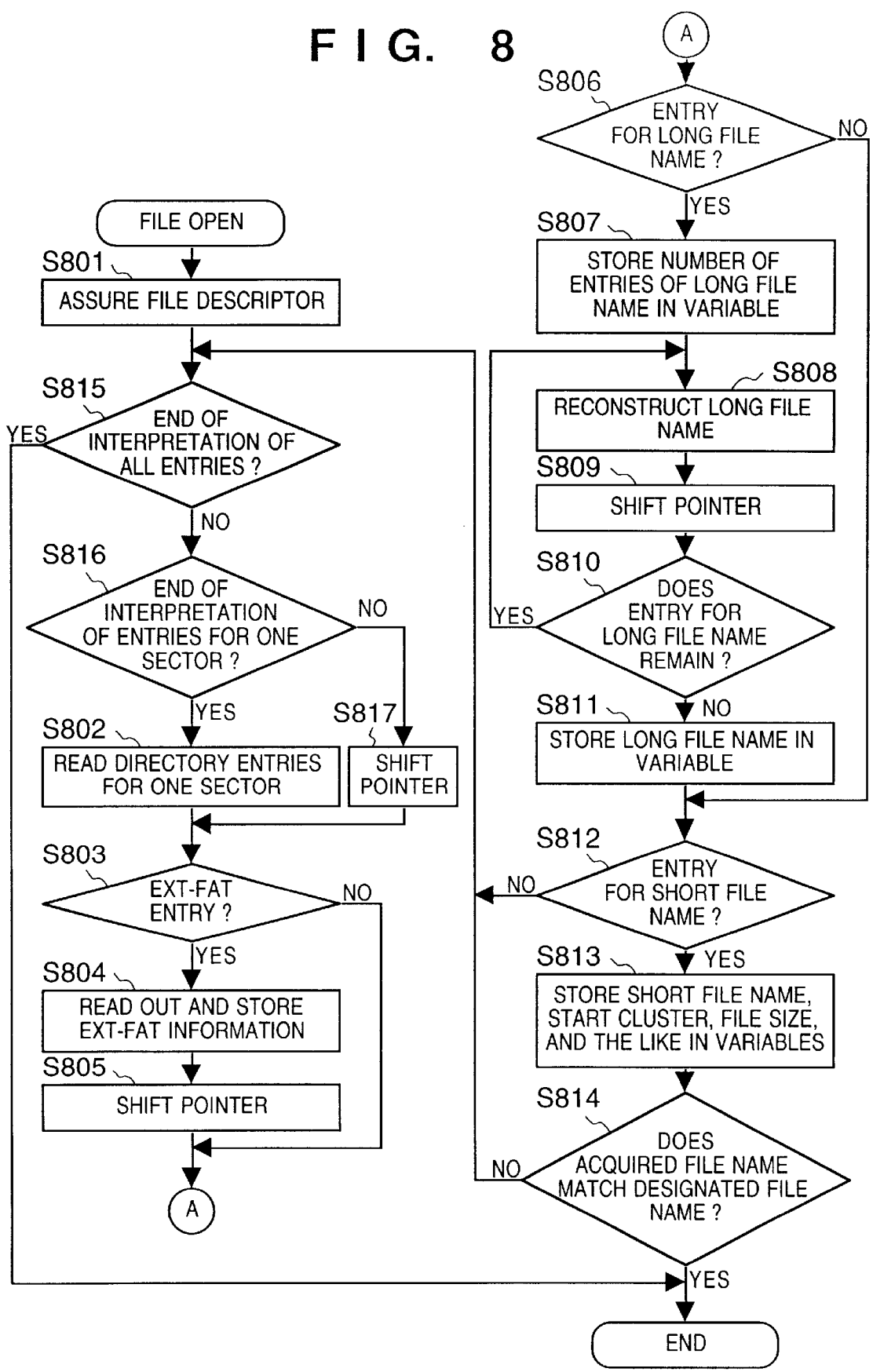
FIG. 8 is a flow chart showing a file search process according to the embodiment of the present invention.

FIG. 7 shows the overall configuration of directory entries of this embodiment.

FIG. 7 especially illustrates the entire directory entries, and shows an example of allocation of pieces of directory entry information for individual files. In this embodiment, the arrangement order of individual files on the directory entries is not particularly specified.

Detailed Description of Operation

The operations of the FAT file system in this embodiment will be explained below using FIGS. 8 to 12. Note that a file which is to undergo read/write is present under the root directory of the FAT disk for the sake of simplicity. Also, a description of an error process will be omitted.

File Read Process

A file read process is roughly composed of a search process of a file from which data is to be read out, and a file read process for actually reading out data from the found file. Especially, the file search process and file read process will be explained respectively using FIGS. 8 and 9.

When the user program 101 issues a file open request, the file manager 103 assures a file descriptor used to express a file as a file to be opened in step S801. Subsequently, the file manager 103 searches the disk for a file designated by the user program 101.

In file search, each directory entry is interpreted to check if a test file (a file to be found by search) is present on the directory entry. It is checked in step S815 if all directory entries have been interpreted. If all directory entries have been interpreted (YES in step S815), the process ends. On the other hand, if directory entries to be interpreted still remain (NO in step S815), the flow advances to step S816 to check if interpretation of directory entries for one is complete. If interpretation of directory entries for one is not complete (NO in step S816), the flow advances to step S817 to shift a pointer that points to the read position of a directory entry. On the other hand, if interpretation of directory entries for one is complete (YES in step S816), the flow advances to step S802.

In step S802, directory entry data for the start sector of a root directory entry 1303 are read onto a memory buffer assured on the RAM 202. Since the memory buffer has already stored directory entries for some files, the directory manager 104 compares the start bytes of respective directory entry items in step S803 to check if the directory entry is the one containing EXT-FAT information. If the directory entry is not the one containing EXT-FAT information (NO in step S803), the flow jumps to step S806. On the other hand, if the directory entry is the one containing EXT-FAT information (YES in step S803), the flow advances to step S804 to store EXT-FAT information of the directory entries in a variable since it is recognized that the directory entry is the one containing EXT-FAT information. Subsequently, the pointer that points to the read position of a directory entry is shifted in step S805.

In step S806, the start byte of the next directory entry 32 bytes ahead of the current pointer position is interpreted to check if that directory entry is the one for a long file name. If the directory entry is not the one for a long file name (NO in step S806), the flow jumps to step S812. On the other hand, if the directory entry is the one for a long file name, i.e., "1" is set at bit 6 (YES in step S806), the flow advances to step S807 to reconstruct a long file name since it is recognized that the directory entry is the one for a long file name. In step S809, the pointer that points to the read position of a directory entry is shifted. It is checked in step S810 if directory entries for a long file name still remain. If such entries still remain (YES in step S810), the flow returns to step S808. On the other hand, if no such entries remain (NO in step S810), the flow advances to step S811.

Upon reconstructing the long file name, since the number of entries of the long file name can be detected from lower 5 bits of the start byte of the directory entry, the long file name is reconstructed while interpreting entries in turn in correspondence with the number of entries of the long file name in steps S808 to S810. In step S811, that long file name is stored in a variable.

Upon completion of reconstruction of the long file name, the start byte of the next entry 32 bytes ahead of the current pointer position is interpreted in step S812 to check if that directory entry is the one for a short file name. If the directory entry is not the one for a short file name (NO in step S812), the flow returns to step S815. On the other hand, if the directory entry is the one for a short file name (YES in step S812), the flow advances to step S813 to obtain information such as the short file name, the start cluster number of the file, the file size, and the like, and store them in variables.

In this way, the file name stored in the root directory entry is acquired, and it is checked in step S814 if the acquired file name matches that designated by the user program 101. If the two file names match (YES in step S814), the process ends. On the other hand, if the two file names do not match (NO in step S814), the flow returns to step S815.

In this way, the data on the root directory entry are read, and the aforementioned process repeats itself until the designated file name matches the acquired file name, or until all data on the root directory entry are read out and interpretation for checking if the designated file name is present is complete.

The read process of the found file will be explained below using FIG. 9.

In step S901, data of the corresponding cluster is read using the start cluster address of the file, which has already been stored in the variable from the directory entry for the short file name. It is then checked if the read data is the end of data. If the read data is the end of data (YES in step S904), the process ends. On the other hand, if the read data is not the end of data (NO in step S904), the flow advances to step S905 to check if read of file data for the designated size is complete. If read is complete (YES in step S905), the process ends. On the other hand, if read is not complete (NO in step S905), the flow advances to step S906.

It is checked in step S906 if FAT chain information of the EXT-FAT has come to an end. If FAT chain information has not come to an end (NO in step S906), the flow advances to step S902 to read the cluster address that contains the next data which follows data recorded at the start cluster address, from the EXT-FAT information already stored in the variable. In step S903, data at the read cluster address is read.

After that, data read repeats itself until read is complete to the end of data of the file designated by the user program 101 while following items of EXT-FAT information in turn (YES in step S904), or until read of file data for the designated size is complete (YES in step S905).

On the other hand, if it is determined in step S906 that the FAT chain information of the EXT-FAT has come to an end (YES in step S906), that is, if data are not read to the end of data of the designated file although all data of cluster addresses indicated by items recorded in the EXT-FAT information are read, or read of data of the file for the designated size is not complete, the flow advances to step S907 to read out a FAT item of the corresponding FAT 1302 from the last EXT-FAT item recorded in the EXT-FAT information to read the cluster address which contains the next data that follows the already read data from the FAT 1302.

After that, the FAT chain is followed in turn in the same manner as in the operation of the FAT file system, and data at the read cluster address is read.

New File Create Process

Figure 10:
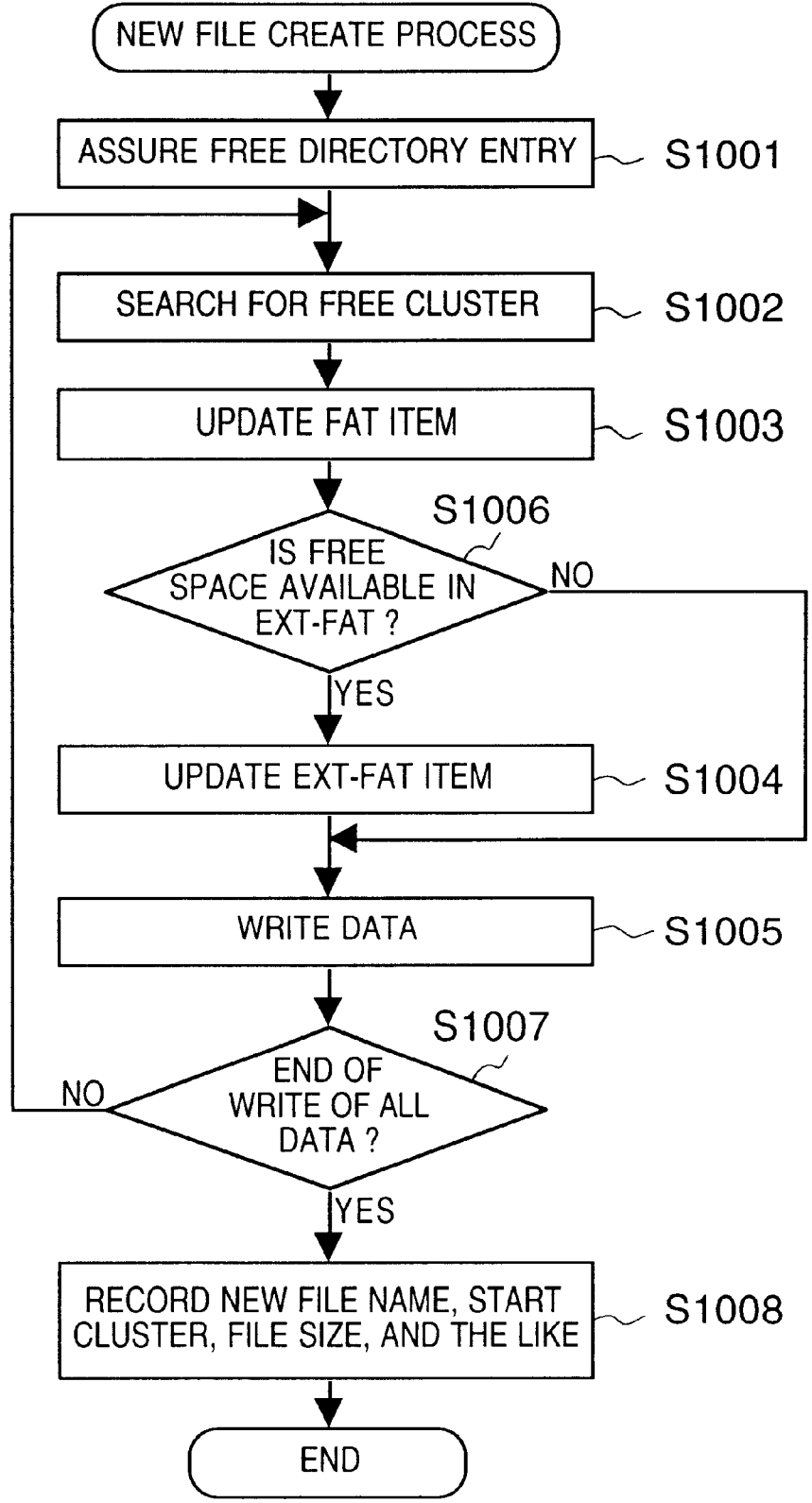
FIG. 10 is a flow chart showing a new file create process according to the embodiment of the present invention.

A new file create process of the data write process will be explained below using FIG. 10.

In a new file create process, substantially the same process as in the file search process described above using FIG. 8 is done as a pre-process, except that the purpose of file search is to detect the absence of the file name designated by the user program 101 on the directory entry. Hence, in the new file create process, if a directory entry with the same file name is found, an error occurs, and the process immediately ends. If no file with the same file name is found as a result of search of all the directory entries, the flow advances to step S1001 in FIG. 10.

In the processes in step S1001 and subsequent steps, substantially the same process as in the new file create process in the conventional FAT file system is done. That is, the directory manager 104 assures directory entries for a new file in step S1001. The directory entries have already been explained previously using FIGS. 3 to 7, and three directory entries are assured on a continuous area on the root directory entry 1303.

In step S1002, the FAT manager 105 reads out data of the FAT 1302 to search for a FAT item that records a free (0000h) value, i.e., search for a free cluster corresponding to that FAT item. If a free cluster is found, the value of that FAT item is rewritten to FFFFh indicating a part of file in step S1003. It is then checked in step S1006 if the EXT-FAT has a free space. If no free space is available (NO in step S1006), the flow jumps to step S1005. On the other hand, if a free space is available (YES in step S1006), the flow advances to step S1004.

In step S1004, the value of the start item (2-byte start address) of the EXT-FAT is rewritten to FFFFh indicating a part of file. In step S1005, required data supplied from the user program 101 is written at the corresponding cluster address on the data area 1304.

It is then checked if all write data have been written. If all data have been written (YES in step S1007), the flow advances to step S1007. On the other hand, if write data still remain (NO in step S1007), i.e., if write data in the data area 1304 cannot fall within one cluster, and still remain, the flow returns to step S1002 to similarly search the FAT 1302 for a FAT item that records a free value. If such FAT item is found, the value of the found FAT item is rewritten to FFFFh (step S1003).

At this time, the process in step S1003 also rewrites the value of the FAT item found in the immediately preceding process to the cluster address corresponding to the FAT item found in the current process. Similar operations are made for the corresponding items (first two bytes, and next two bytes in the current state) of the EXT-FAT (step S1004). If all FATs for 13 clusters that can be recorded in the EXT-FAT are full of data (NO in step S1006), step S1004 is skipped. Finally, data is written at the corresponding cluster address (step S1005).

By repeating this process, the cluster arrangement order is recorded in turn in the FAT 1302 and EXT-FAT, thus completing a FAT chain.

With the above process, if writing of all write data in the data area 1304 is complete (YES in step S1007), and if writing of the FAT chain in the FAT 1302 and EXT-FAT is also complete, the directory manager 104 records information such as a new file name (long file name, short file name), start cluster address, file size, and the like in the root directory entry 1303. In this way, a new file is created.

Data Additional Write Process to Existing File

Figure 11:
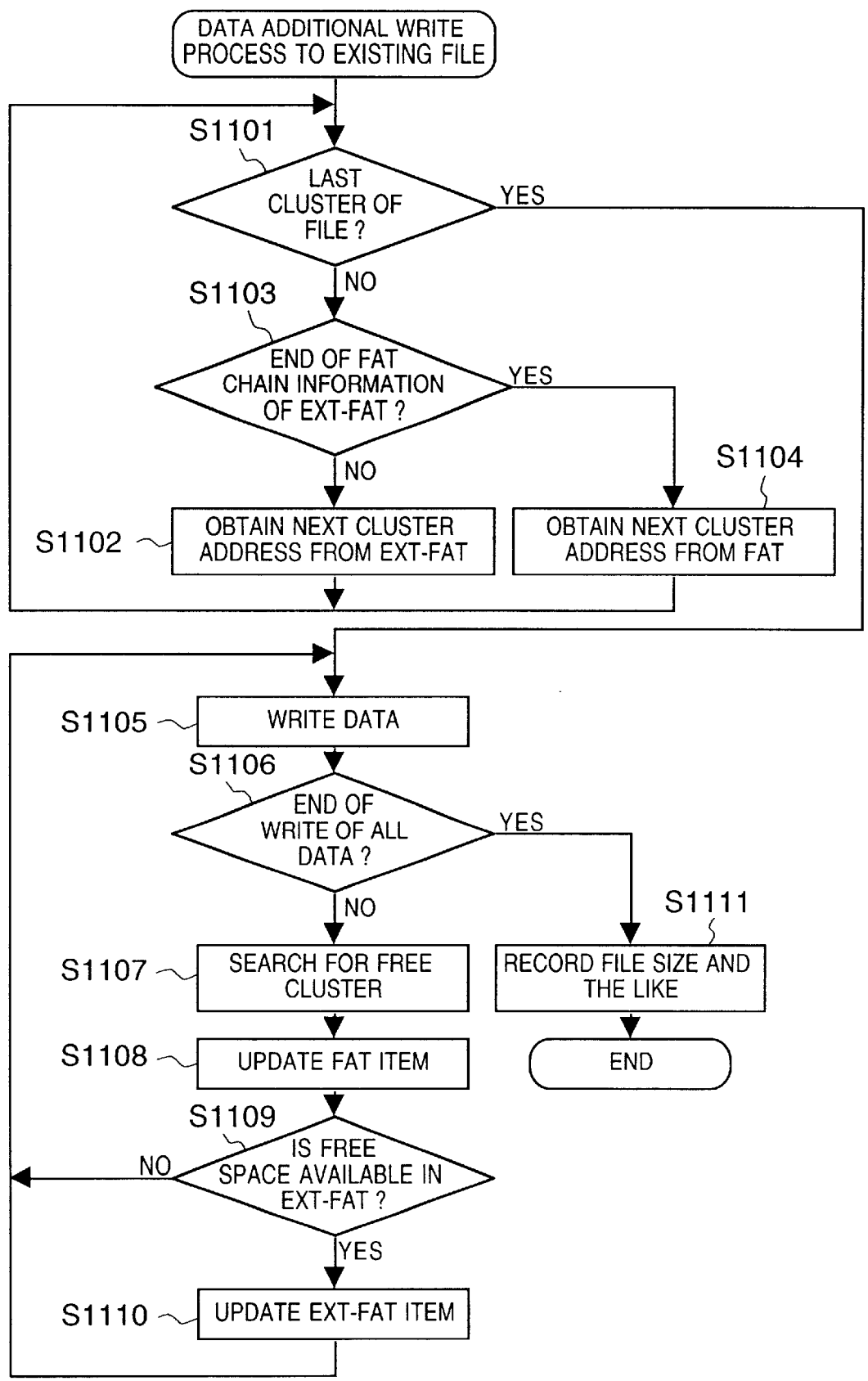
FIG. 11 is a flow chart showing a data additional write process to an existing file according to the embodiment of the present invention.

A data additional write process to an existing file will be explained using FIG. 11.

Figure 9:
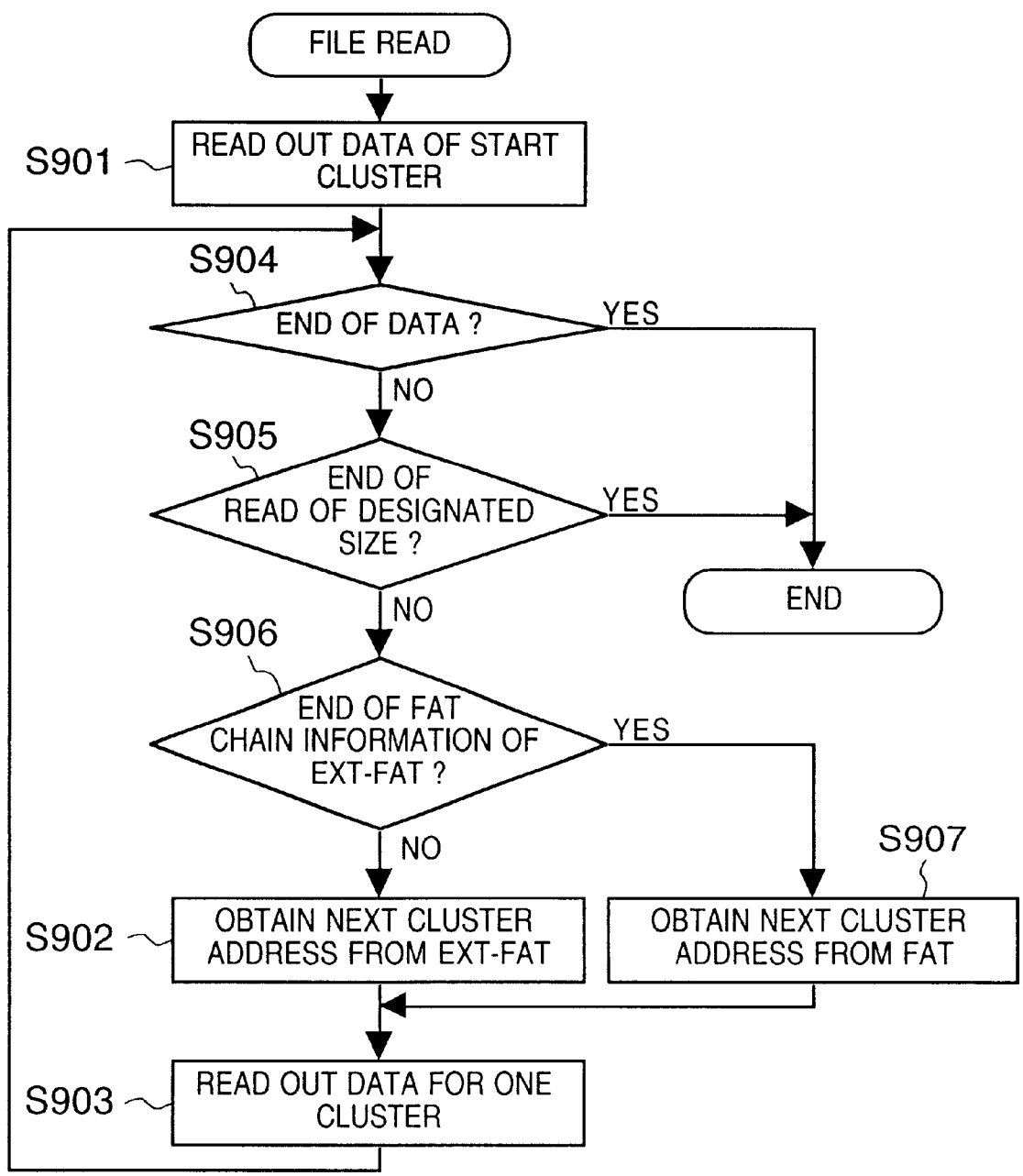
FIG. 9 is a flow chart showing a file read process according to the embodiment of the present invention.

In the data additional write process to an existing file, after a file descriptor is assured and a file open request is issued as in the file read process in FIG. 9, it is checked in step S1101 if the cluster of interest is the last cluster. If the cluster of interest is the last cluster (YES in step S1101), the flow jumps to step S1105. On the other hand, if the cluster of interest is not the last cluster (NO in step S1101), the flow advances to step S1103. It is checked in step S1103 if FAT chain information of the EXT-FAT has come to an end. If the FAT chain information has not come to an end (NO in step S1003), the flow advances to step S1102, and the FAT manager 105 obtains the start cluster address and the last cluster by following a FAT chain in turn from the EXT-FAT items.

On the other hand, if the FAT chain information has come to an end (YES in step S1103), i.e., if the size of the file designated by the user program 101 has exceeded the number of clusters (13 clusters in this embodiment) that can be recorded in the EXT-FAT, the flow advances to step S1104 to obtain the last cluster by following the FAT chain in turn from the FAT 1302. If the last cluster is obtained, the flow advances to step S1105.

In the last cluster, the existing data is written halfway through the cluster size. Hence, desired data to be added is written after the end of the data stored halfway through the cluster in step S1105.

It is then checked in step S1106 if all write data have been written. If all data have been written (YES in step S1106), the flow advances to step S1111. On the other hand, if write data still remain, i.e., the required data to be added cannot fall within that cluster, the FAT 1302 is searched for a free cluster in step S1107 as in the new file create process. If a free cluster is found, the value of the item of the FAT 1302 corresponding to the free cluster is rewritten to FFFFh indicating a part of file in step S1108.

It is checked in step S1108 if a free space is available in the EXT-FAT. If no free space is available (NO in step S1109), the flow returns to step S1105. On the other hand, if a free space is available (YES in step S1109), the flow advances to step S1110 to rewrite the value of the EXT-FAT to FFFFh indicating a part of file, thus completing a FAT chain.

After that, desired data is written in a free cluster in the data area 1304 (step S1105). By repeating the aforementioned process, data is additionally written. Finally, the directory manager 104 records information such as the file size after data additional write or the like in the root directory entry 1303 in step S1111.

Data Overwrite Process to Existing File

Figure 12:
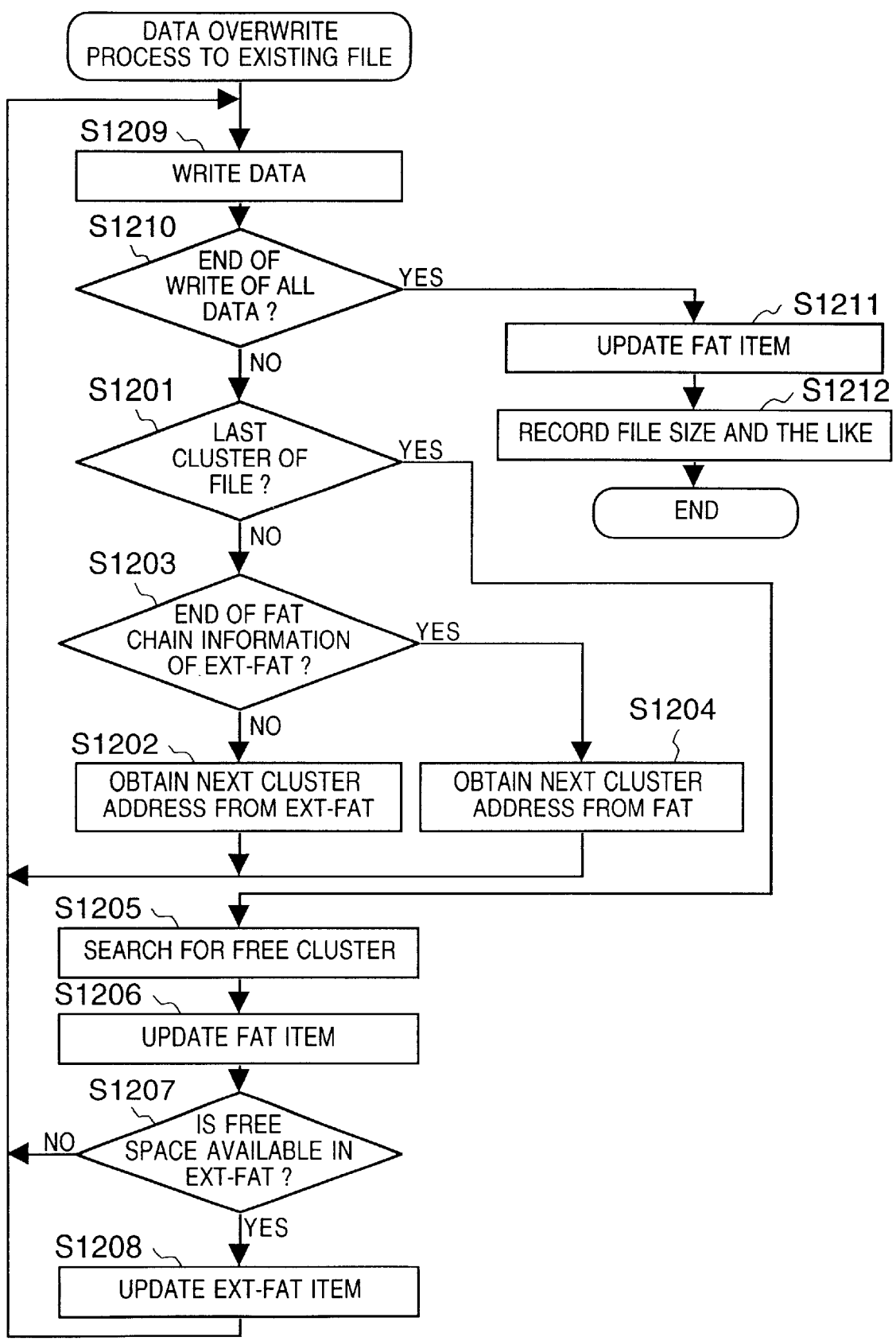
FIG. 12 is a flow chart showing a data overwrite process to an existing file according to the embodiment of the present invention.

A data overwrite process to an existing file will be explained below using FIG. 12.

In the data overwrite process to an existing file, after a file descriptor is assured and a file open request is issued as in the file read process in FIG. 9, clusters of the data area 1304 corresponding to EXT-FAT or FAT items in turn from the start cluster address are overwritten by overwrite data designated by the user program 101 in step S1209. It is checked in step S1210 if write of all overwrite data is complete. If write is complete (YES in step S1210), the flow advances to step S1211. On the other hand, if overwrite data still remain (NO in step S1210), the flow advances to step S1201.

It is checked in step S1201 if the cluster of interest, whose cluster is overwritten in step S1209, is the last cluster of an existing file. If the cluster of interest is the last cluster (YES in step S1201), the flow jumps to step S1205. On the other hand, if the cluster of interest is not the last cluster (NO in step S1201), the flow advances to step S1203. It is checked in step S1203 if FAT chain information of the EXT-FAT has come to an end. If FAT chain information has not come to an end (NO in step S1203), the flow advances to step S1202, and the FAT manager 105 obtains the next cluster address from the EXT-FAT items.

On the other hand, if the FAT chain information has come to an end (YES in step S1203), i.e., if the size of the file designated by the user program 101 has exceeded the number of clusters (13 clusters in this embodiment) that can be recorded in the EXT-FAT, the flow advances to step S1204 to obtain the next cluster by following the FAT chain from the FAT 1302.

In step S1205, the FAT 1302 is searched for a FAT item that records a free value, thus searching for a free cluster corresponding to that FAT item. If a free cluster is found, the value of that FAT item is rewritten to FFFFh indicating a part of file in step S1206.

It is checked in step S1207 if a free space is available in the EXT-FAT. If no free space is available (NO in step S1207), the flow returns to step S1209. On the other hand, if a free space is available (YES in step S1207), the flow advances to step S1208 to rewrite the value of the item of the EXT-FAT to FFFFh indicating a part of file.

If it is determined in step S1210 that write of all overwrite data is complete, i.e., the data size of the existing file is larger than that of the overwrite file, the FAT manager 105 rewrites the value of the EXT-FAT item or item of the FAT 1302 corresponding to the last cluster of the data of the overwrite file to FFFFh indicating a part of file in step S1211. Also, the FAT manager 105 rewrites the value of the EXT-FAT item or item of the FAT 1302 corresponding to each remaining cluster which does not store any overwrite data in the FAT chain before overwrite to 0000h (indicate a free cluster). In step S1212, the directory manager 104 records the file size of after data overwrite or the like in the root directory entry 1303.

As described above, according to this embodiment, the FAT file system assures an area called an EXT-FAT that records a part of FAT chain on the directory entry of each file. When a FAT chain is read out upon, e.g., reading out/writing a file, the FAT chain recorded in the EXT-FAT is preferentially used. In this way, data to be manipulated can be accessed by looking up the FAT chain recorded in the EXT-FAT without looking up that on the FAT. As a result, the time required for interpreting file allocation data to be manipulated can be shortened, and high-speed read of the FAT chain can be attained while maintaining compatibility with the conventional FAT file system.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the storage medium, that storage medium stores program codes corresponding to the flow charts shown in FIGS. 8 to 12 mentioned above.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus for managing a file stored on a storage medium by looking up a file allocation table, comprising:

storage control means for storing file data of a file in data area;

management means for storing and managing a part of storage position information both in the file allocation table and in a predetermined storage area in a directory entry, and index information in the directory entry, wherein the storage position information indicates a storage position in data area of the file, the directory entry stores information which pertains to the file and the index information indicates whether or not the directory entry contains the storage position information; and execution means for executing access to the file data in the data area by looking up the file allocation table and the directory entry managed by said management means when the directory entry contains the index information, while executing access to the file data in the data area by looking up the file allocation table when the directory entry does not contain the index information.

2. The apparatus according to claim 1, wherein the predetermined storage area is allocated immediately in front of an area that stores a file name of the file.

3. The apparatus according to claim 1, wherein said management means appends to a head of the predetermined storage area an index indicating that the predetermined storage area stores the storage position information.

4. The apparatus according to claim 1, wherein said execution means looks up the storage position information of the file data stored in the directory entry when access to the file is instructed, before looking up the file allocation table.

5. An information processing method for managing a file stored on a storage medium by looking up a file allocation table, comprising:

storage control means for storing file data in a file in data area;

a management step, of storing and managing a part of storage position information both in the file allocation table and in a predetermined storage area in a directory entry, and index information in the directory entry, wherein the storage position information indicates a storage position in data area of the file, the directory entry stores information which pertains to the file and the index information indicates whether or not the directory entry contains the storage position information; and an execution step, of executing access to the file data in the data area by looking up the file allocation table and the directory managed in the management step when the directory entry contains the index information, while executing access to the file data in the data area by looking up the file allocation table when the directory entry does not contain the index information.

6. The method according to claim 5, wherein the predetermined storage area is allocated immediately in front of an area that stores a file name of the file.

7. The method according to claim 5, wherein the management step includes the step of appending to a head of the predetermined storage area an index indicating that the predetermined storage area stores the storage position information.

8. The method according to claim 5, wherein the execution step includes the step of looking up the storage position information of the file data stored in the directory entry when access to the file is instructed, before looking up the file allocation table.

9. A computer readable memory that stores program code of information processing for managing a file stored on a storage medium by looking up the file allocation table, comprising:

storage control means for storing file data of a file in data area;

a program code of a management step, of storing and managing a part of storage position information both in the file allocation table and in a predetermined storage area in a directory entry, and index information in the directory entry, wherein the storage position information indicates a storage position in data area of the file, the directory entry stores information which pertains to the file and the index information indicates whether or not the directory entry contains the storage position information; and a program code of an execution step, of executing access to the file in the data area by looking up the file allocation table and the directory entry managed in the management step when the directory entry contains the index information, while executing access to the file data in the data area by looking up the file allocation table when the directory entry does not contain the index information.

* * * * *